Patented Sept. 19, 1950

2,522,937

UNITED STATES PATENT OFFICE 2,522,937

SOLDER FLUX

Gordon M. Forker, Cleveland Heights, Ohio, assignor to General Electric Company, a corporation of New York No Drawing. Application March 30, 1949,
Serial No. 84,487

10 Claims. (Cl. 148—23)

My invention relates to solder fluxes in general, and more particularly to a solder flux of the non-conductive and non-corrosive type.

There are a great many soldering applications where it is desirable to employ a solder flux which is substantially non-conductive as well as non-corrosive. For example, there are certain types of electric lamps (such as are used in household appliances, for instance) where it is desirable to employ such a non-conductive and non-corrosive flux in the soldering of the lead-in wires to the metal end contacts of the lamp bases during the lamp basing operation, the reason being, inter alia, to insure against the presence of a conductive flux residue on the base which might cause arcing or a short-circuit between the normally insulated metal shell and end contact of the base, or between the two metal end contacts in the case of a double end contact base. Likewise, if the flux residue were of a corrosive character, it would attack the soldered metal parts and might cause eventual failure of the soldered joint and, therefore, premature lamp failure.

While non-corrosive or so-called "safe" solder fluxes are well known per se, so far as known they are all objectionable, for one reason or another, for use in modern high-speed machine manufacturing methods involving automatic soldering operations. There are resin type fluxes, for example, which are of non-corrosive character, but they are too slow or insufficiently reactive for satisfactory use in high-speed machine soldering operations. Likewise, there are wax type solid fluxes of non-corrosive character, consisting essentially of a heavy metal chloride such as zinc chloride and a fatty acid such as stearic or oleic acid which, while sufficiently active for high-speed machine soldering operations, are of a nature which renders them inconvenient and messy to use in such machine applications. With such waxy solid type fluxes it is necessary to preheat and melt the solid flux material before starting the machine in operation. Where the machine is not equipped with a device for preventing its operation when the solder flux is not so melted, there is always the danger of the operator, through oversight, starting the machine in operation without first having melted the solder flux, with the result that the automatically operating flux-applying fingers of the machine, which normally dip into the melted flux in the flux-containing pot, strike instead against the solidified flux material in the flux pot and as a consequence are either bent or broken, thus necessitating the repair, and delay in the operation of the machine. Moreover, drops of the molten flux fall from the flux-applying fingers and solidify and collect on various parts of the machine in sticky and unsightly accumulations thereon which require periodic removal.

It is an object of my invention, therefore, to provide a non-conductive and non-corrosive type solder flux which overcomes the disadvantages enumerated above of known fluxes of such type.

Another object of my invention is to provide a non-conductive and non-corrosive solder flux which is highly reactive and of liquid form and which leaves a flux residue of non-corrosive, non-conductive, and non-tacky character.

Further objects and advantages of my invention will appear from the following detailed description of species thereof. The solder flux according to the invention consists, in general, of a mixture of a heavy metal chloride such as zinc chloride, a fatty acid such as stearic or oleic acid, an organic amine hydrochloride, and one or more of the group of higher diols or glycols having a relatively low hygroscopicity.

The heavy metal chloride, fatty acid and amine hydrochloride constituents of the flux serve as cleaning agents which function to loosen the oxide film on the metal parts being soldered and then dissolve or otherwise displace any loosened oxide particles. These cleaning agent components of the flux are dissolved in the diol or glycol solvent to form a flux of liquid form.

Zinc chloride is preferably employed as the heavy metal chloride cleaning agent in the flux, it being the most commonly used for such purpose and the least expensive. If desired, however, any other suitable heavy metal chloride (such as tin or cadmium chloride, for instance) which acts as a cleaning agent in a solder flux in a manner similar to zinc chloride, may be used instead.

The fatty acids which have been found particularly suitable for the purposes of the invention are those which impart the least corrosive action to the flux, i. e., those having a relatively high molecular weight of around 250 or higher such as, for example, stearic, oleic or palmitic acid. Such high molecular weight fatty acids are all suitable because of their relatively low ratio of active acid-forming hydrogen to the rest of the acid molecule, which therefore renders such acids less corrosive. Stearic acid, however, is preferably employed since it has been found to possess the best properties for the particular purposes and also is one of the less expensive of the fatty acids.

The organic amine hydrochloride component of the improved flux materially increases the reactivity thereof so that it is especially advantageous for use in machine soldering applications where relatively high speed in the soldering operation is demanded. The amine hydrochlorides, which are organic materials of acid nature, may be either of the aromatic type such as aniline hydrochloride for instance, or of the aliphatic type such as ethylene diamine hydrochloride. Aniline hydrochloride, however, is preferably employed because, among other things, it has a boiling point (245° C.) high enough to allow the said material to remain on the metal and "work" or clean during the soldering operation for a reasonable length of time, and yet be boiled off and removed from the metal surfaces before the soldering operation is completely finished so as not to remain on such surfaces and possibly exert a corrosive effect thereon.

The solvents which I have found to be particularly suited to the purposes of the invention are so-called higher diols, (i. e., glycols or dihydroxy alcohols) which are derivatives of butane or a higher molecular weight hydrocarbon (i. e., having four or more carbon atoms in its molecular structure), and which have a relatively low hygroscopicity or moisture absorption. These diols serve as coupling agents or mutual solvents for the dissimilar cleaning agent materials of the flux, the heavy metal chloride flux component being an inorganic material which is water soluble while the fatty acids used are soluble only in organic solvents. In addition, the diols function as wetting agents to decrease the surface tension between the ingredients of the flux and aid the penetration of the oxide film by the active materials of the flux to help bring into intimate contact with the surface of the metal to be soldered.

As indicated above, the diols which are employed as solvents in accordance with the invention are those higher diols which have a relatively low hygroscopicity or moisture absorption and for such reason impart the least conductive and corrosive characteristics to the resulting flux composition. For this purpose it is preferred to employ only those diols which have a maximum moisture absorption of less than approximately 20 per cent by weight and preferably less than 10 per cent by weight. Representative examples of such low hygroscopic higher diols which have been found particularly suitable for the purposes of the invention are 2-ethyl hexanediol-1,3; 2-methyl pentanediol-2,4 (hexylene glycol) and 2-methyl pentanediol-1,3, all of which have a maximum moisture absorption of less than 10 per cent under conditions of 63 per cent relative humidity at 25° C. Of these three specific diols, however, hexylene glycol has been found to be the most preferable for the purposes of the invention, it retaining a substantially constant moisture content over a wide range of humidity. Dipropylene glycol is another higher diol which may be used, although it is considerably more hygroscopic than the three diols specifically mentioned above, it having a maximum moisture absorption somewhere between 15-20 per cent by weight under the same conditions of realtive humidity and temperature set forth above.

The diols within the group indicated as being suitable for the purposes of the invention may be used either separately as the sole solvent for the solid materials of the flux, or two or more of them may be mixed together in any desired proportions to form the solvent. If desired, one or more additional solvent materials, such as water or alcohol for instance, may be utilized along with the diol or diols to aid in the solubility of the solids in the flux composition. Water helps to dissolve the metal chloride and the amine hydrochloride constituents of the flux while alcohol helps to dissolve the fatty (stearic) acid and the amine hydrochloride. It is preferable, however, to avoid the use of water as a solvent addition in order to render the resulting flux less corrosive and conductive.

While the proportions of the various individual ingredients in the improved solder flux according to the invention may vary to a considerable extent, I have found the following range of proportions, by weight, to be particularly suitable:

| | Per cent |
|---|---|
| Solvents | 75-95 |
| Amine hydrochloride | 1- 5 |
| Metal chloride | 2-15 |
| Fatty acid | 2-10 |

The upper limits of this range of percentage content of the solvents are set by the solubility of the various solids in the solvents used, while the lower percentage limits are determined by the minimum contents which render the flux active enough to give the desired rapid fluxing action. A specific flux composition according to the invention which I have found to be particularly suitable is as follows:

| | Per cent |
|---|---|
| Hexylene glycol | 65-70 |
| 2-ethyl hexanediol-1,3 | 15-20 |
| Aniline hydrochloride | 2- 3 |
| Zinc chloride | 5- 7 |
| Stearic acid | 5- 7 |

The solder flux composition comprising my invention may be conveniently prepared or formulated simply by warming the solvent, or the solvents together, to about 60° C., adding the metal chloride and stirring until the solution becomes clear, then adding the fatty acid component and continue stirring. The fatty acid should dissolve almost at once. The amine hydrochloride is finally added and the solution stirred about 15 minutes. The resulting solution is then allowed to stand and settle for a period of at least several hours or so, e. g., overnight, after which the solution is poured off into bottles to form the liquid solder flux composition comprising my invention, leaving any settled solid materials behind.

Liquid solder fluxes according to the invention possess the requisite high-reactivity or speed for use in machine soldering applications, are convenient to use in such applications because they do not have to be preheated and do not leave a tacky residue, and besides possess excellent non-conductive and non-corrosive properties. For example, current leakage tests conducted on certain types of lamps having their lead-in wire connections to the lamp bases soldered with the flux according to the invention, have shown that less than 1% of the lamps fail to meet the prescribed minimum base leakage resistance of 1 megohm at approximately 700 volts A. C.

What I claim as new and desire to secure by Letters Patent of the United States is:

1. A liquid solder flux composition consisting essentially of from 2 to 15 parts by weight of a heavy metal chloride, from 2 to 10 parts by weight of a high molecular weight fatty acid, from 1 to 5 parts by weight of an organic amine hydrochloride, and a solvent consisting essentially of one or more higher diols of relatively low hygroscopicity at 63 per cent relative humidity and 25° C. and having at least a four-carbon chain molecule, said solvent being present in an amount sufficient to form a liquid solution.

2. A liquid solder flux composition consisting essentially of from 2 to 15 parts by weight of a heavy metal chloride, from 2 to 10 parts by weight of a high molecular weight fatty acid, from 1 to 5 parts by weight of an organic amine hydrochloride, and a solvent consisting essentially of one or more higher diols having at least a four-carbon chain molecule and characterized by a maximum moisture absorption of less than approximately 20 per cent at 63 per cent relative humidity and 25° C., said solvent being present in an amount sufficient to form a liquid solution.

3. A liquid solder flux composition consisting essentially of from 2 to 15 parts by weight of zinc chloride, from 2 to 10 parts by weight of a fatty acid having a molecular weight above approximately 250, from 1 to 5 parts by weight of an organic amine hydrochloride, and a solvent consisting essentially of one or more higher diols having at least a four-carbon chain molecule and characterized by a maximum moisture absorption of less than approximately 20 per cent at 63 per cent relative humidity and 25° C., said solvent being present in an amount sufficient to form a liquid solution.

4. A liquid solder flux composition consisting essentially of from 2 to 15 parts by weight of zinc chloride, from 2 to 10 parts by weight of stearic acid, from 1 to 5 parts by weight of aniline hydrochloride, and a solvent consisting essentially of one or more higher diols having at least a four-carbon chain molecule and characterized by a maximum moisture absorption of less than approximately 20 per cent at 63 per cent relative humidity and 25° C., said solvent being present in an amount sufficient to form a liquid solution.

5. A liquid solder flux composition consisting essentially of from 2 to 15 parts by weight of zinc chloride, from 2 to 10 parts by weight of stearic acid, from 1 to 5 parts by weight of aniline hydrochloride, and a solvent consisting essentially of 2-methyl pentanediol-2,4 and 2-ethyl hexanediol-1,3 in an amount sufficient to form a liquid solution.

6. A liquid solder flux composition consisting essentially of by weight approximately 2–15 per cent of a heavy metal chloride, approximately 2–10 per cent of a fatty acid having a molecular weight above 250, approximately 1–5 per cent of an organic amine hydrochloride, and approximately 75–95 per cent of one or more higher diols having at least a four-carbon chain molecule and characterized by a maximum moisture absorption of less than approximately 20 per cent at 63 per cent relative humidity and 25° C.

7. A liquid solder flux composition consisting of by weight approximately 2–15 per cent zinc chloride, approximately 2–10 per cent of a fatty acid having a molecular weight above 250, approximately 1–5 per cent of an organic amine hydrochloride, and approximately 75–95 per cent of one or more higher diols having at least a four-carbon chain molecule and characterized by a maximum moisture absorption of less than approximately 10 per cent at 63 per cent relative humidity and 25° C.

8. A liquid solder flux composition consisting essentially of by weight approximately 2–15 per cent zinc chloride approximately 2–10 per cent stearic acid, approximately 1–5 per cent aniline hydrochloride, and approximately 75–95 per cent of one or more diols having at least a four-carbon chain molecule and characterized by a maximum moisture absorption of less than approximately 10 per cent at 63 per cent relative humidity and 25° C.

9. A liquid solder flux composition consisting essentially of by weight approximately 5–7 per cent zinc chloride, approximately 5–7 per cent stearic acid, approximately 2–3 per cent aniline hydrochloride, approximately 15–20 per cent 2-ethyl hexanediol-1,3 and approximately 65–70 per cent 2-methyl pentanediol-2,4.

10. A liquid solder flux composition consisting essentially of from 2 to 15 parts by weight of a heavy metal chloride from 2 to 10 parts by weight of a high molecular weight fatty acid, from 1 to 5 parts by weight of an organic amine hydrochloride, and a solvent consisting essentially of one or more higher diols of the group consisting of 2-ethyl hexanediol-1,3 2-methyl pentanediol-2,4 and 2-methyl pentanediol-1,3, said solvent being present in an amount sufficient to form a liquid solution.

GORDON M. FORKER.

REFERENCES CITED

The following references are of record in the file of this patent:

UNITED STATES PATENTS

| Number | Name | Date |
| --- | --- | --- |
| 1,783,925 | Mougey | Dec. 2, 1930 |
| 1,811,667 | Gravell | June 23, 1931 |

Certificate of Correction

Patent No. 2,522,937  September 19, 1950

GORDON M. FORKER

It is hereby certified that error appears in the printed specification of the above numbered patent requiring correction as follows:

Column 6, line 7, after the word "consisting" insert *essentially*;

and that the said Letters Patent should be read as corrected above, so that the same may conform to the record of the case in the Patent Office.

Signed and sealed this 7th day of August, A. D. 1951.

[SEAL]

THOMAS F. MURPHY,
*Assistant Commissioner of Patents.*